May 27, 1930.  J. A. FORTUNE ET AL  1,760,636
REFRIGERANT COMPRESSOR
Filed Aug. 6, 1928   2 Sheets-Sheet 1

INVENTORS:
JOHN A. FORTUNE,
DAVID E. WHITSON.
By Harry G. Beimes
ATTORNEY.

May 27, 1930.                J. A. FORTUNE ET AL                 1,760,636
                              REFRIGERANT COMPRESSOR
                              Filed Aug. 6, 1928         2 Sheets-Sheet 2
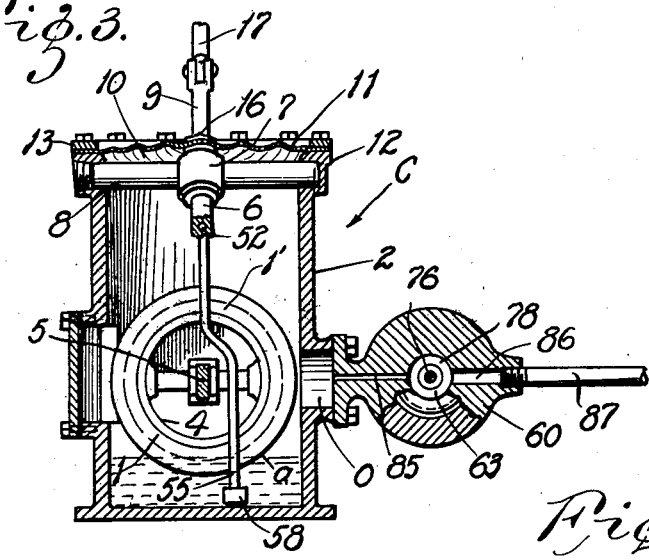
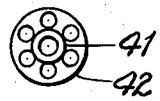
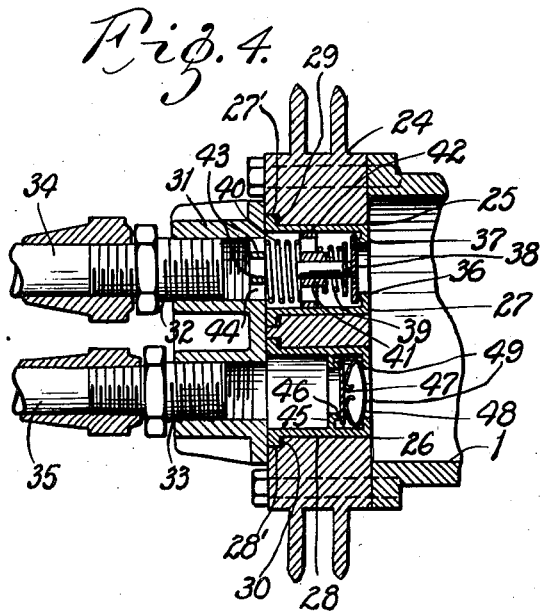
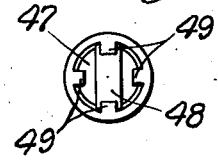
INVENTORS:
JOHN A. FORTUNE,
DAVID E. WHITSON.
BY Harry E. Benne
ATTORNEY.

Patented May 27, 1930

1,760,636

UNITED STATES PATENT OFFICE

JOHN A. FORTUNE AND DAVID E. WHITSON, OF ST. LOUIS, MISSOURI, ASSIGNORS OF ONE-THIRD TO EDWARD SCHAAF, OF ST. MARYS, MISSOURI

REFRIGERANT COMPRESSOR

Application filed August 6, 1928. Serial No. 297,838.

Our invention has relation to improvements in compressors primarily for use in refrigerating systems, and consists in the novel features of construction more fully set forth in the specification and pointed out in the claims.

Small refrigerating plants for household use such as have recently come into extensive use employ a refrigerant that under normal temperature is a gas such as sulphur dioxide, methyl chloride, and ethyl chloride and other compounds having similar physical properties.

Obviously, the system employing such refrigerant must be tightly sealed to avoid loss of the refrigerant into the atmosphere and also to prevent atmospheric air from entering the low pressure side of the system. If an extensive amount of refrigerant is lost, the system will in time cease to operate efficiently, and should atmospheric air enter the system, other deleterious effects would follow especially where sulphur dioxide is the refrigerant, as the moisture in the atmosphere will combine with the $SO_2$ radical to form corrosive sulphurous acid ($H_2SO_3$). This acid attacks the bearings and joints, eventually putting the system out of use.

It is the object of our invention to provide a compressor having pistons operated by a rocking lever instead of a rotary crank shaft to permit sealing the connections between the movable members of the compressor and the casing with a flexible diaphragm which may be tightly secured to said respective members. A seal that is tightly secured is obviously more effective than the seals now in use on compressors having a crank shaft because the latter seals must include a rubbing connection such as ground joints or packing. It is a further object of the present invention to provide means of maintaining a balanced pressure in the crank case compressor so that there will be no tendency for the refrigerant to escape into the atmosphere.

It is also an object of the present invention to have both intake and exhaust valves in the cylinder head so that the gas will not have to be drawn through the crank case and contact with the body of oil therein. In the types of compressors wherein the gas is drawn through the crank case, there is a tendency for the oil to be carried over with the gas and be forced through the system. Of course, should an excess of oil get into the system, the compressor is robbed of lubrication and at the same time the oil interferes with the circulation of the refrigerant in the coils, preventing refrigeration.

We have sought to overcome this difficulty by preventing the building up of pressure in the crank case. The means employed will be more fully explained in connection with the description of the invention.

It is also an object of the present invention to construct the compressor along lines that will provide easy access to the parts for purposes of repairs and the replacement of parts that have become injured through wear. Further and other advantages will be better apparent from a detailed description of the invention in connection with the accompanying drawings, in which:

Figure 1 is a vertical longitudinal section through our improved compressor with parts left in elevation; Fig. 2 is a top plan of the compressor with the crank case pressure control valve in section. Fig. 3 is a vertical transverse section taken on the line 3—3 of Fig. 2; Fig. 4 is a cross sectional detail taken through a cylinder head showing the valve construction; Fig. 5 is a face view of the perforated disc which forms a part of the exhaust valve mechanism; Fig. 6 is a bottom view of the intake valve cage; and Fig. 7 is a cross sectional detail taken on the line 7—7 of Fig. 2.

Referring to the drawings, C represents our improved compressor comprising oppositely disposed cylinders 1, 1 formed integrally with a crank case 2, the inner ends 1', 1' of the cylinders extending into the crank case and terminating in flanges $a$, $a$ between which and the crank wall is held a suitable packing 3 of cotton waste, wool packing, or equivalent substance capable of absorbing oil. A multiplicity of holes $o$ are provided in the cylinder extensions 1' to permit oil to drain from the packing 3, 3 into the cylinders 1, 1. Pistons 4, 4 are operable in cylinders 1, 1, said pistons being connected by means of connecting rods 5, 5 to a rocking lever 6, the upper end of which is provided with a suitable hub 7 mounted for oscillation on the shaft 8 transversely disposed in the upper part of the crank case 2.

An extension 9 of lever 6 is screw-threaded into the top of hub 7 and projects upwardly through opening 10 in the top of the crank case, which opening is adapted to be closed by a flexible diaphragm 11 held tightly at its periphery to a flange 12 by a ring 13 which is bolted into said flange. The diaphragm 11 is provided with an opening 14 at its center through which the lever 9 passes, said diaphragm being held tightly against the hub 7 by a nut 15 and a lock nut 16. A connecting rod 17 is pivotally connected at one end to the upper end of lever 9, the opposite end terminating in a strap 18 which receives an eccentric disc 19 secured to a drive shaft 20. The shaft 20 is mounted in suitable standards 21, 21 and may be actuated either by a directly connected motor (not shown) or by pulley 22 and belt 23.

On the outer end of each cylinder 1 is bolted a head 24 within which are openings 25 and 26 for receiving respectively the exhaust valve cage 27 and intake valve cage 28. Cages 27 and 28 have flanges 27' and 28' formed on their outer ends, which flanges rest in recesses 29, 30 respectively whereby the cages are securely held in place beneath the coupling plate 31 which is bolted to the cylinder head 24. A pipe coupling 32 leading to the high pressure side of the refrigerating system and a pipe coupling 33 leading to the low pressure side of the system are secured in the plate 31, the former receiving a pipe 34 and the latter a pipe 35. The inner end of valve cage 27 is provided with a flange 36 having a valve seat 37 for the exhaust valve 38 which is maintained against the seat by two springs 39 and 40, the former having less tension than the latter and being disposed over the hub 41 of a perforated disc 42, slidably mounted in the cage 27.

The spring 40 is confined between disc 42 and a pair of abutment bars 43, 43 disposed across opening 44 in the coupling plate 31. Within the cage 28 is provided a flange 45 having a seat 46 for intake valve 47 which is held against said seat by a flexed spring 48 confined between said valve and a plurality of lugs 49 projecting inwardly from the inner end of cage 28.

An oil cup 50 is secured into hub 7, said cup leading to shaft 8 by a port 51, and to connecting pin 5' between lever 6 and connecting rods 5, 5 by a port 52 passing lengthwise through lever 6. An oil pump comprising a cylinder 53 and plunger 54, the former pivoted to the wall of crank case C and the latter to the lever 6, keeps the cup 50 supplied with oil. When the lever 6 moves away from the cylinder 53, oil is sucked from the crank case through pipe 55, and when the lever 6 is rocked in the opposite direction, the oil is forced through pipe 56 to the oil cup 50. Pipes 55 and 56 are provided with ball check valves 57 and 58 as well understood in the art.

The parts thus far described constitute the compressor proper and are operable as such as follows:

Upon driving the shafts 20, eccentric 19 will cause the connecting rod 17 to reciprocate and rock the lever 6 back and forth about the shaft 8 as a fulcrum, which in turn causes the pistons 4, 4 to reciprocate in their cylinders 1, 1. Since the pistons are opposed, their functions will also be opposed so that when one piston is passing through a suction stroke, the opposite piston will be passing through its compression stroke. As the cylinders are identical in their construction, further description will be confined to but one cylinder. On the suction stroke of piston 4, the intake valve 47 will be tipped away from its seat 46, overcoming the tension of spring 48. This also allows the refrigerant gas to be drawn into the cylinder from the pipe 35 in the low pressure side of the piston. When the piston has reached the end of its suction stroke, valve 47 will immediately snap back into its seat, allowing the gas to be compressed on the compression stroke of the system, and when the pressure within the cylinder has reached an amount sufficient to overcome the tension of spring 39, the disk valve 38 will be unseated, allowing the gas to escape through the cage 27 and opening 44 to pipe 34 in the high pressure side of the system. During the greatest part of the compression stroke, both springs 39 and 40 are compressed to allow exhaust valve 38 to open wide and permit the gas to pass rapidly into the high pressure side of the refrigerator system. The advantage of the spring 39 of comparatively small tension is that it takes but a slight pressure in the cylinder to tip the valve 38, thus insuring that said valve will be open throughout the entire compression stroke.

It, of course, is understood that the pressure even in the low pressure side of the system is always above atmospheric pressure (with the refrigerants in common use), and that during such times that the compressor is idle, such as when defrosting the cooling unit, the pressure throughout the system becomes balanced. It is, therefore, a decided advantage to have both the intake and the exhaust valves at the end of the cylinder so that the gas does not have to pass through the crank case where this pressure would constantly be exerted against the seal between the crank case and the atmosphere. It is also an advantage to have the pressure outside of the crank case as it will oppose any tendency of the oil to get past the pistons into the system. Another advantage of keeping the refrigerant out of the crank case is that the pressure within the crank case may then be balanced with the atmospheric pressure to prevent either the escape of gas from the crank case or the drawing in of moist air from the atmosphere.

We have provided a pressure regulating valve for preserving this balance of pressure in the crank case which will now be described.

The crank case C is provided with an opening O in one side, and a valve casing 60 is bolted to said side of the crank case over the opening O. Two chambers 61 and 62 are formed in the casing 60 on opposite sides, said chambers being connected by an intermediate chamber 63 of reduced diameter. The other end of chamber 61 is internally threaded to receive a valve casing 64, the valve casing 64 having an axially disposed bore 65 terminating at its inner end in a tapered valve seat 66 between which and the bore 65 is an enlarged annular passageway 67. The casing 64 is provided with a port 68 communicating with the passageway 67, said port registering with a second port 69 in the housing 60, and a pipe 70 leads from the expansion coil of the refrigerating system (not shown) to port 69. An end plate 71 is tightly secured on the end of housing 60 that carries the valve casing 64, said plate being traversed by stud 72 having a disc 73 secured to its inner end, between which and valve 74 slidably mounted in the bore 65 is a coil spring 75.

The tension of spring 75 is adjustable by screwing the stud 72 back and forth and in the absence of a counter pressure, keeps the valve 74 on its seat 66. A stem 76 projects from the inner end of valve 74 into a metal bellows 77 whose inner end terminates in a threaded nipple 78 whereby the bellows is secured into the chamber 63. The bellows 77 extends into the chamber 62 and carries a dished plate 78' on its outer end between which and the disc 79, carried by stud 80, is coiled spring 81. The stud 80 is screwthreaded through end plate 82 for the purpose of adjusting the tension on the spring 81. The stem 76 of valve 74 is adapted to contact with the inner surface of plate 78 when the valve 74 is on its seat 66, and the springs 75 and 81 are adjusted so that there will be a pressure within the bellows 77 equal to atmospheric pressure. This pressure will also exist within the crank case C since it is connected by a port 85 leading to chamber 63 from the crank case. The housing 60 is provided with a hole 86 communicating with chamber 63, the outer end of said hole being threaded to receive a pipe 87 leading to the suction end of the compressor. The operation of the balancing valve just described is as follows:

When the compressor is put into operation, it will immediately exhaust the air from chamber 63 and the inside of the bellows, causing said bellows to contract, and thereupon unseat valve 74. The unseating of valve 74 places pipes 87 and 70 into communication, allowing the gas from the expansion coil to be drawn into the cylinder of the compressor; the adjustment of the springs is such that the valve 74 will continue to unseat until a pressure of approximately fourteen pounds is established in the chamber 63, and, of course, the crank case.

Any variation of the pressure in the crank case and chamber 63 during the operation of the pressure will cause a change in the position of valve 74, either reducing or increasing its opening. It will be noticed that there are a plurality of longitudinally disposed slots 88 in the periphery of valve 74, the purpose of which is to prevent the building up of pressure in the chamber 61 behind the valve. From the foregoing it will be seen that the device just described operates as a pressure regulator for maintaining the desired pressure in the crank case of the compressor, so as to prevent any tendency for gas to be forced out of the pressure into the atmosphere, or atmospheric air into the compressor, and at the same time, preventing oil from being forced from the crank case into the refrigerating system.

Having described our invention, we claim:

1. A compressor comprising a cylinder, crank case, and piston operable in the cylinder, said cylinder having its skirt perforated and extending into the crank case, and an oil absorbent packing around said skirt.

2. A compressor comprising a cylinder, crank case, and piston operable in the cylinder, an intake and an exhaust valve in the cylinder head, means for sealing the crank case from the atmosphere, and means for maintaining a predetermined pressure in said crank case.

3. A compressor comprising a cylinder, crank case, and piston operable in the cylinder, an intake and an exhaust valve in the cylinder head, means for sealing the crank case from the atmosphere, and a balanced valve connected to the compressor intake and to the crank case, for automatically responding to changes in pressure in the crank case and maintaining such pressure constant.

4. A compressor for refrigerating systems comprising a cylinder, crank case, and piston operable in the cylinder, an intake and an exhaust valve in the cylinder head, means for sealing the crank case from the atmosphere, and means for maintaining a predetermined pressure in said crank case, said last mentioned means comprising a balanced valve operable by the compressor.

5. A compressor for refrigerating systems comprising a cylinder, crank case, and piston operable in the cylinder, an intake and an exhaust valve in the cylinder head, means for sealing the crank case from the atmosphere, and means for maintaining a predetermined pressure in said crank case, said last mentioned means comprising a housing having oppositely disposed connected chambers, a balanced valve in one of said chambers, a pressure responsive device in the other chamber, and means for making suitable connections to said chambers.

In testimony whereof we hereunto affix our signatures.

JOHN A. FORTUNE.
DAVID E. WHITSON.